R. S. BRYANT.
DETACHABLE WHEEL.
APPLICATION FILED SEPT. 19, 1913.

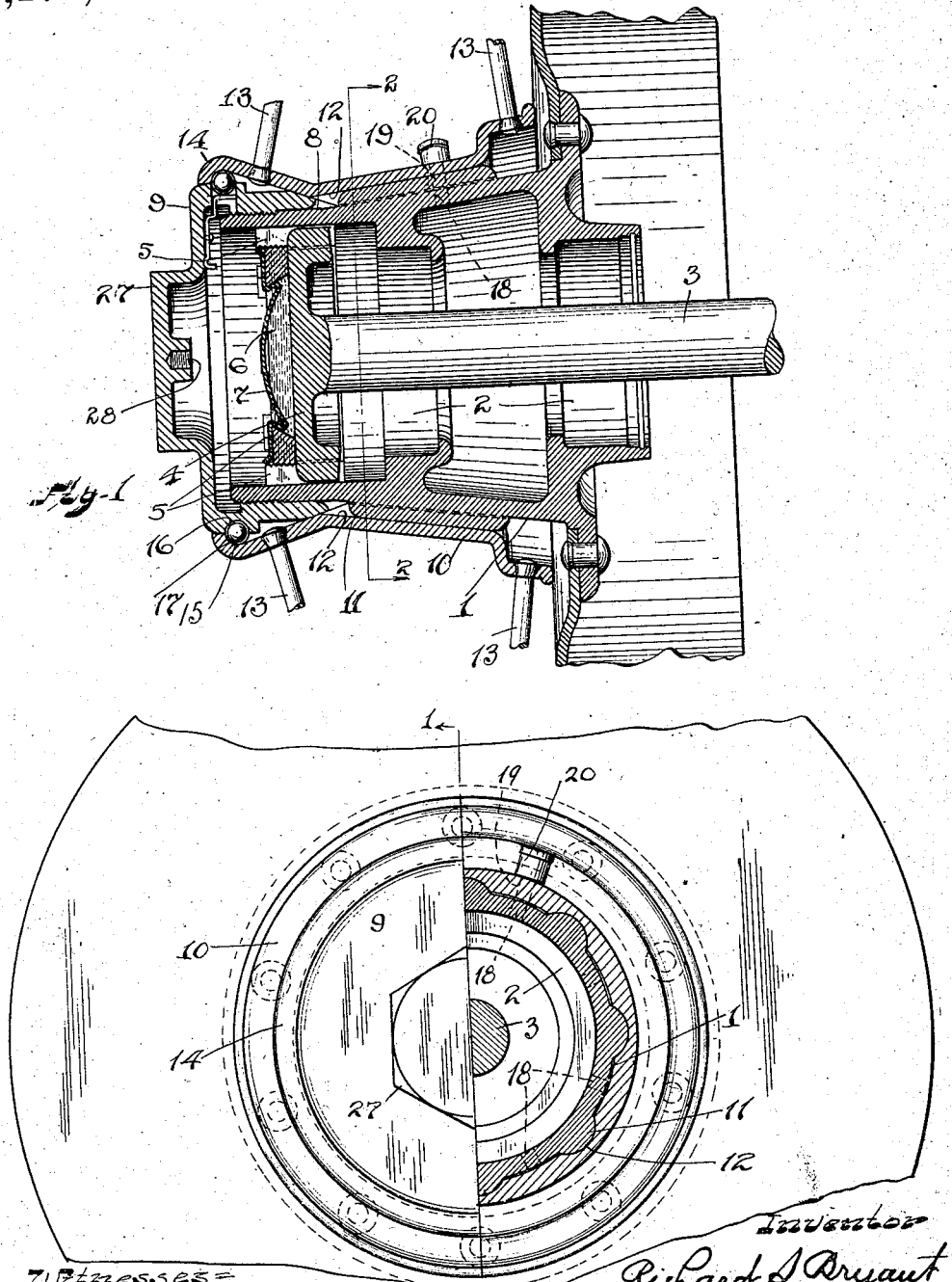

1,179,398.

Patented Apr. 18, 1916.
2 SHEETS—SHEET 2.

Witnesses

Inventor
Richard S. Bryant
By Fay & Oberlin
Attorneys

UNITED STATES PATENT OFFICE.

RICHARD S. BRYANT, OF CLEVELAND, OHIO, ASSIGNOR TO THE STANDARD WELDING COMPANY, OF CLEVELAND, OHIO, A CORPORATION OF OHIO.

DETACHABLE WHEEL.

1,179,398.   Specification of Letters Patent.   Patented Apr. 18, 1916.

Application filed September 19, 1913. Serial No. 790,786.

*To all whom it may concern:*

Be it known that I, RICHARD S. BRYANT, a citizen of the United States, and a resident of Cleveland, county of Cuyahoga, and State of Ohio, have invented a new and useful Improvement in Detachable Wheels, of which the following is a specification, the principle of the invention being herein explained and the best mode in which I have contemplated applying that principle, so as to distinguish it from other inventions.

The present improvements, relating as indicated to detachable or demountable wheels, have as their object the provision of a construction of double hub consisting of an inner sleeve normally rotatably secured to the vehicle axle and an outer sleeve or shell to which the inner ends of the spokes are fixed, which outer shell is normally fixedly secured on the inner sleeve but may be removed therefrom when desired.

A further object of the invention is to provide a construction of the foregoing description, which will be simple and compact and yet insure safety against accidental separation of the two hub parts at all times.

To the accomplishment of these and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 3:
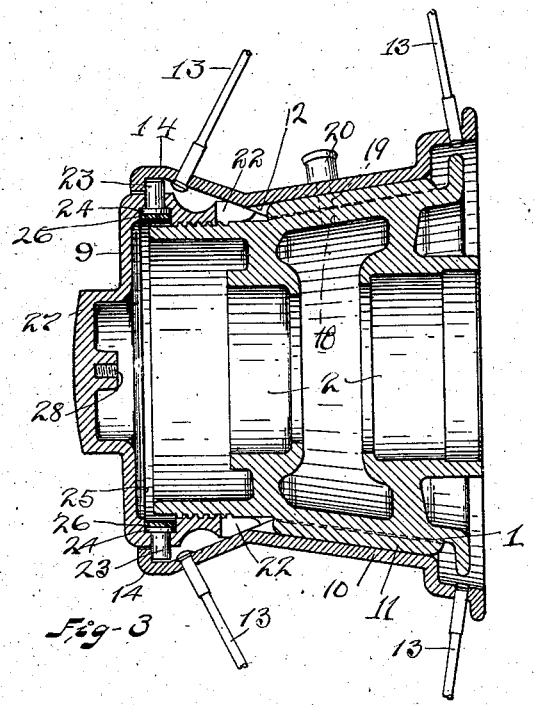
Figure 4:
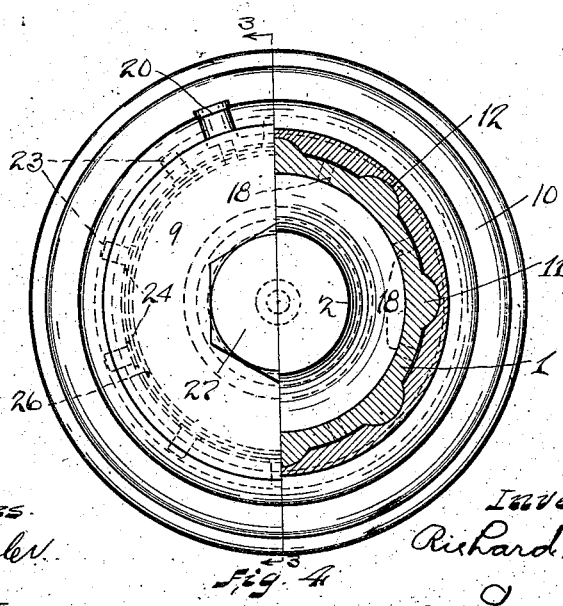

In said annexed drawings:—Figure 1 is a central longitudinal section of the hub and the appurtenant parts of a wheel embodying my present improvements; Fig. 2 is partly a front elevation and partly a transverse section of such hub, the plane of the section being indicated by the line 2—2 Fig. 1; Fig. 3 is a section similar to Fig. 1, but showing a modified construction; and Fig. 4 is a view similar to Fig. 2, showing the same modification.

The wheels shown in the foregoing figures are of the wire spoke type of construction, but the features of construction characterizing the hub are not necessarily limited to use on this specific type of wheel. The wheel is furthermore shown in Figs. 1 and 2 as a rear wheel and in Figs. 3 and 4 as a front wheel, from which it will be understood that my improvements are equally applicable to both. In the case of the rear wheel the supporting tubular axle is omitted, only the inner or live axle section being shown, and in the case of the front wheel the supporting spindle is similarly not illustrated.

Referring to the rear wheel structure of Figs. 1 and 2, the inner hub member, which is in the form of a general tapering sleeve 1, will be rotatably mounted on the end of the tubular supporting axle, suitable ball or roller bearings (not shown) being interposed between inwardly directed races 2 on such hub member and said axle. The live axle 3 may be journaled at its outer end in such tubular axle or not, depending upon whether the axle is of so-called "floating" construction or not. The form illustrated in the drawings is of the floating type, having its extremity 4 notched to engage a series of lugs 5 projecting inwardly from the hub member after the fashion of a clutch, as will be readily understood. The inner hub member 1 is secured against endwise movement relatively to axle-section 3, by means of a nut 6 that is screwed in to the sleeve from its outer end against the axle's extremity 4. A spring clip 7, extending diametrically across this nut and adapted to engage the recesses between the lugs 5 in the hub member, serves to hold said nut against undesired rotation. This clip, however, may be readily pried out with a screw driver, or like implement, the nut unscrewed, and the inner hub member thus disengaged from the axle-section. It is not deemed necessary to illustrate in Figs. 3 and 4 the mounting of this inner hub member, where the wheel is a front wheel mounted directly on a spindle, instead of its being a rear wheel. In the case of such front wheel construction, moreover, the brake drum, which is incidentally shown in Figs. 1 and 2, is of course, omitted.

As stated, the inner hub member is of general tapered form, but its terminal portion 8 is substantially cylindrical, being externally threaded to receive an internally threaded cap or nut 9 which closes the end of said inner hub member and also serves to secure the outer hub member 10 firmly thereon, as will be presently described. The tapering, or beveled, portion of said inner hub member is provided with a series of longitudinally extending ribs 11 as clearly shown in Figs. 1 and 2, the forward ends of said ribs being rounded or beveled slightly so as to facilitate their locking engagement with grooves 12, which are formed on the inner face of the outer removable hub member. The latter supports the wheel structure proper through the medium of spokes 13, the rest of the structure being omitted from the drawings. The outer portion 14 of this removable hub member 10 is flared, as best shown in Fig. 1, so as to provide an inner beveled surface against which the inner edge of the retaining cap 9 may be pressed, the latter being correspondingly beveled so as to have a wedging engagement with the former. In assembling the wheel, accordingly, the outer hub member, being placed on the inner hub member with its grooves 12 engaging with the ribs 11 on the latter, is forced into tight engagement with such ribs by drawing up the securing cap so that the two hub members constitute, in effect, an integral structure. The cap 9 is furthermore desirably rotatably secured to said outer hub member, so as to be removed therewith. To this end, I may employ the construction shown in Fig. 1, whereby said cap is rotatably locked to the hub member through the medium of a plurality of balls 15 held in a race formed by a channel 16 encircling the cap and a groove 17 formed in the outer hub member by slightly recurving its extreme outer edge. As a result of thus securing the cap to the hub member, said cap not only serves to firmly seat the hub member as above described, but upon rotating the cap in the opposite direction, it relieves the seating pressure on the hub member and also positively withdraws the latter from engagement with the inner hub member, so that as soon as the threads of the cap are entirely unscrewed, the wheel is sufficiently loosened to permit its ready removal.

To facilitate the lubrication of the bearings within the inner hub it is desirable to have a hole for lubricant extending through the hub members. Accordingly, as means for conveniently securing an opening, whereby access may thus be had for lubricant to the interior of the hub structure, I provide a series of apertures 18 in a circle surrounding the inner hub member, one aperture being located between each tongue or rib 11. The outer hub member, then, is provided with a single aperture 19 located midway between any two of the complementary grooves 12 in its inner surface, so that no matter where the outer hub member may be seated on the inner hub member, a direct opening into the interior is assured. A closure, or cap 20, of any suitable design, such as shown in Figs. 1 and 2, may be used in connection with the opening in said outer hub member.

Aside from showing hub members adapted to be mounted on a front wheel spindle, Figs. 3 and 4 show a modification in the construction of retaining cap 9. In the first place, the beveled edge of such cap, designed to engage with the flaring portion 14 of hub member 10 is provided with a series of short slots 22 after the fashion of a collet, thus insuring better wedging action. In the second place, instead of balls 13, a series of pins 23, are utilized to rotatably secure the cap to the hub member. These pins project through suitable apertures in the cap, being provided with heads 24 adapted to seat in a groove 25 formed on the inside of such cap. A transversely split annular spring 26 is adapted to hold these pins in place by pressing outwardly against their heads, and when thus in place their ends project sufficiently to engage the inwardly curved edge of the hub member, just as do the balls in the first-described construction.

Either form of construction, it will be evident, provides an extremely simple and compact hub despite its double character. The means of locking the outer member against rotation on the inner member may be made amply strong to withstand any strain, while the cap 9 serves both to lock said outer hub member against longitudinal movement on the inner hub member, and to remove the former from the latter when desired. The only implement required in mounting, or demounting, the wheel, is a wrench, the cap being provided on its outer face with a nut 27 for use with such wrench. The cap is also provided on its inner face with a threaded hole 28 to receive a bolt, whereby a closure plate (not shown) may be secured on the rear end of the outer hub member when the wheel is detached.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. A wheel for vehicles and the like, comprising an inner hub member; an outer hub member longitudinally movable on said inner hub member into non-rotative engagement therewith, said outer member supporting the wheel structure, proper; a nut adapted to be threaded on said inner member and to press against said outer member; and separate anti-friction means rotatably securing said nut to said outer member.

2. A wheel for vehicles and the like, comprising an inner hub member; an outer hub member longitudinally movable on said inner member into non-rotative engagement therewith, said outer member supporting the wheel structure, proper; a nut adapted to be threaded on said inner member and to wedge between the same and said outer member; and separate anti-friction means rotatably securing said nut to said outer member.

3. A wheel for vehicles and the like, comprising an inner hub member; an outer hub member longitudinally movable on said inner member into non-rotative engagement therewith, said outer member supporting the wheel structure, proper; a nut adapted to be threaded on said inner member and to wedge between the same and said outer member; and removable anti-friction means adapted to rotatably secure said nut to said outer member.

4. A wheel for vehicles and the like, comprising an inner hub member; an outer hub member longitudinally movable on said inner member into non-rotative engagement therewith, said outer member supporting the wheel structure, proper; a nut adapted to be threaded on said inner member and to wedge between the same and said outer member, said nut being formed externally with an encircling groove; and a series of balls in such groove projecting radially from said nut into engagement with said outer member, thereby rotatably securing the former to the latter.

5. A wheel for vehicles and the like, comprising an inner hub member; an outer hub member longitudinally movable on said inner member into non-rotative engagement therewith, said outer member supporting the wheel structure, proper, and being formed with an internal encircling groove; a nut adapted to be threaded on said inner member and to wedge between the same and said outer member, said nut being formed externally with an encircling groove; and a series of balls in such groove projecting radially from said nut into engagement with the internal encircling groove in said outer member, thereby rotatably securing the former to the latter.

6. A wheel for vehicles and the like, comprising an inner hub member of general tapered form with its terminal portion substantially cylindrical; longitudinally extending ribs on the tapered portion of said member; an outer hub member supporting the wheel structure, proper, and having an internally grooved portion adapted to fit over the tapered portion of said inner member and be held against relative rotation by the ribs thereon, the end of said outer member being flared outwardly; a nut adapted to be threaded on the cylindrical portion of said inner member and to wedge between the same and such flared portion of said outer member; and anti-friction means rotatably securing said nut to said outer member.

7. A wheel for vehicles and the like, comprising an inner hub member of general tapered form with its terminal portion substantially cylindrical; longitudinally extending ribs on the tapered portion of said member; an outer hub member supporting the wheel structure, proper, and having an internally grooved portion adapted to fit over the tapered portion of said inner member and be held against relative rotation by the ribs thereon, the end of said outer member being flared outwardly; a nut adapted to be threaded on the cylindrical portion of said inner member and to wedge between the same and such flared portion of said outer member; and removable anti-friction means adapted to rotatably secure said nut to said outer member.

8. A wheel for vehicles and the like, comprising an inner hub member of general tapered form with its terminal portion substantially cylindrical; longitudinally extending ribs on the tapered portion of said member; an outer hub member supporting the wheel structure, proper, and having an internally grooved portion adapted to fit over the tapered portion of said inner member and be held against relative rotation by the ribs thereon, the end of said outer member being flared outwardly; a nut adapted to be threaded on the cylindrical portion of said inner member and to wedge between the same and such flared portion of said outer member, said nut being formed externally with an encircling groove; and a series of balls in such groove projecting radially from said nut into engagement with said outer member, thereby rotatably securing the former to the latter.

9. A wheel for vehicles and the like, comprising an inner hub member of general tapered form with its terminal portion substantially cylindrical; longitudinally extending ribs on the tapered portion of said member; an outer hub member supporting the wheel structure, proper, and having an internally grooved portion adapted to fit over the tapered portion of said inner member and be held against relative rotation by the ribs thereon, the end of said outer member being flared outwardly and then recurving slightly to form an internal encircling groove; a nut adapted to be threaded on the cylindrical portion of said inner member and to wedge between the same and such flared portion of said outer member, said nut being formed externally with an encircling groove and a series of balls in such groove projecting radially from said nut into engagement with the internal encircling groove in the flared end of said outer member, thereby rotatably securing the former to the latter.

Signed by me, this 16 day of Sept., 1913.

RICHARD S. BRYANT.

Attested by—
J. C. MAUTERNACH,
S. W. HARTLEY.